Sept. 23, 1952     K. V. DAVIS     2,611,193
ARITHMETIC FRACTION TRAINER
Filed July 5, 1949
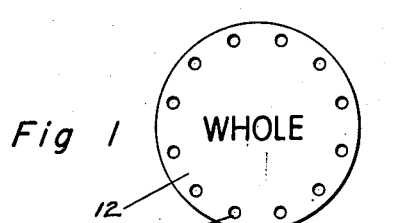
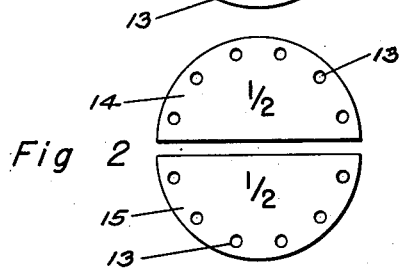
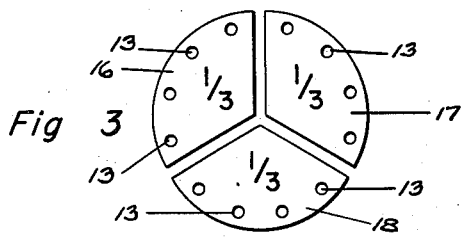
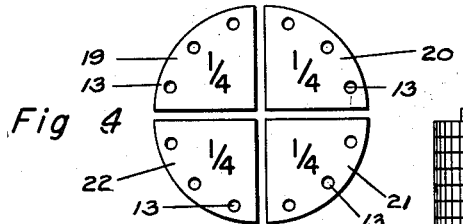
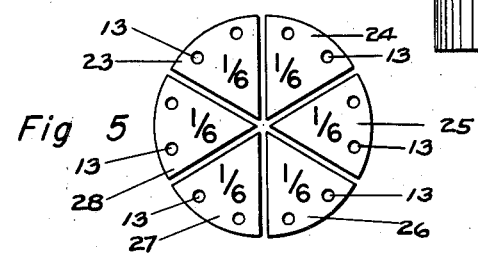
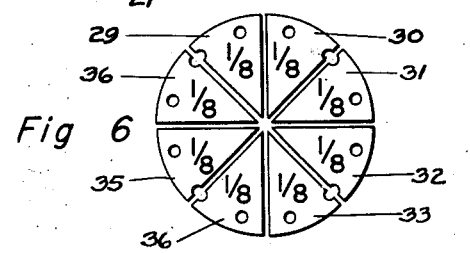
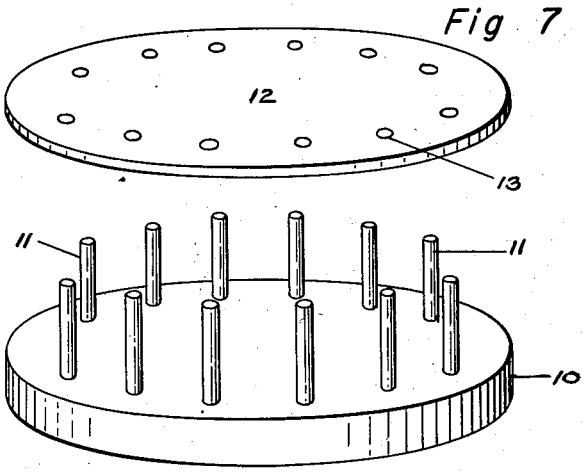
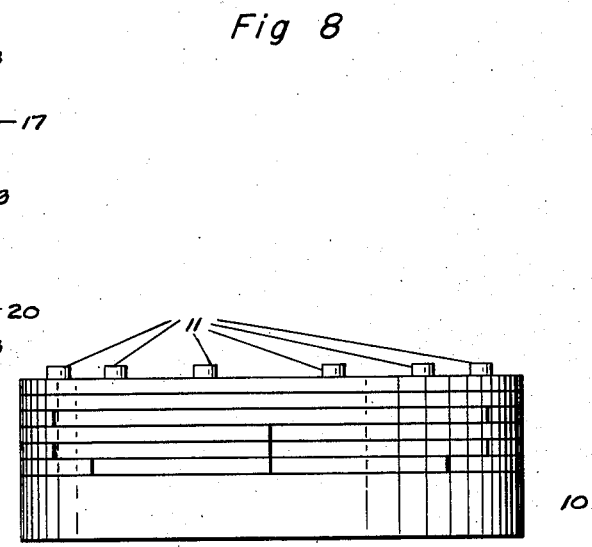
INVENTOR.
Kenneth V. Davis
BY Edward C. Healy
Attorney Patented Sept. 23, 1952

2,611,193

UNITED STATES PATENT OFFICE 2,611,193

ARITHMETIC FRACTION TRAINER

Kenneth V. Davis, San Francisco, Calif.

Application July 5, 1949, Serial No. 103,019

2 Claims. (Cl. 35—31)

This invention relates to a device employed in teaching mathematical fractions and the like and has for the primary object the provision of a plurality of divided discs for identifying the particular fractions it is desired to teach.

An object of the present invention is to divide each disc in the particular number of sections simulating the particular fractions, each section simulating the particular fraction it is desired to reach.

Another object of the present invention is the provision of a circumferential horizontal base provided with a plurality of upwardly extending fixed vertical pins, which pins function to retain the sections forming the disc in the correct position to provide the complete circle.

A further object of the present invention is the provision of a device employed in teaching fractions, which device is formed of a circular horizontal base member and a plurality of divided discs horizontally positioned one on the other and removably retained on the base member and to construct the device in a manner that is durable, simple in construction, economical to manufacture and highly efficient and serviceable in use.

In the accompanying drawing forming a part of the specification, wherein for the purpose of illustration like numerals designate like parts throughout the same, Fig. 1 designates the top disc which disc is undivided, Fig. 2 is a plan view of the second disc, which disc is divided in halves, Fig. 3 is a plan view of the third disc divided in thirds, Fig. 4 is a plan view of the fourth disc divided in fourths, Fig. 5 is a plan view of the fifth disc divided in sixths, Fig. 6 is a plan view of the sixth disc, divided in eighths, Fig. 7 is a perspective view of one of the discs, which disc is undivided, Fig. 8 is a perspective view of the circular base member and disclosing to advantage the series of vertical plugs circumferentially positioned thereon, and Fig. 9 is a side elevational view of the complete base member disclosing to advantage the series of discs positioned thereon in series one above the other.

Referring in detail to the drawing and the numerals thereof, the numeral 10 designates the base member of the device, which base member is preferably formed circumferential in shape and is provided with a plurality of vertical pins 11, preferably twelve in number, the said pins being fixed in the base and extending upwardly therefrom as disclosed to advantage in Fig. 8. In Fig. 1 there is disclosed to advantage the top undivided disc 12 perforated as at 13 to fit the vertical pins 11. The disc disclosed in Fig. 2 is divided in halves 14 and 15 and is also perforated as at 13 to fit the said vertical pins 11, and is positioned beneath the top undivided disc 12. Likewise the third disc illustrated in Fig. 3 is divided in thirds, forming sections 16, 17 and 18. The fourth disc disclosed to advantage in Fig. 4 is formed of four equal sections 19, 20, 21 and 22. The fifth disc disclosed to advantage in Fig. 5 is formed of six equal sections 23, 24, 25, 26, 27 and 28, and, likewise, the sixth disc is formed of eight equal sections 29, 30, 31, 32, 33, 34, 35 and 36, respectively, as disclosed to advantage in Fig. 6. Each of the sections are marked according to their divisions, for example, ½, ⅓, ¼, ⅙ and ⅛, as disclosed to advantage in Figs. 2, 3, 4, 5 and 6 respectively, and likewise can be colored in different colors, red, white, blue, yellow and green, respectively, to facilitate identification. Although the sections shown in the accompanying drawing have been limited to eighths, it will be obvious that any suitable number of sections can be formed and marked and colored accordingly. Each of the sections are marked and colored to facilitate identification.

From the description disclosed taken in consideration with the accompanying drawing, it will be obvious that the pupil will be able to see and thus count the sections forming the complete unit and thus recognize the relationship and add or subtract the same at a glance.

It is to be understood that the form of my invention herewith shown and described is to be taken as preferred example of the same and that various changes relative to the shape, size, material and arrangement of parts may be resorted to without departing from the spirit of the invention or the scope of the subjoined claims.

Having thus described my invention, I claim:

1. A device for use in teaching mathematical fractions comprising a circular base member, a plurality of upwardly extending pins arranged thereon and of a predetermined number, a plurality of varied colored discs adapted to be positioned on said pins in stacked formation, said discs comprising a unitary disc, half discs and segmental discs, all of which have indicia thereon either designating a unitary number or fractions thereof, the unitary disc being provided with openings therein corresponding in number to the number of the upwardly extending pins and the two half discs and the segmental parts of the segmental discs having openings therein that correspond in number to the predetermined number of the upwardly extending pins.

2. A device for use in teaching mathematical fractions comprising a circular base member, a series of upwardly extending vertical pins arranged circumferentially on said base member, a plurality of varied colored discs capable of being positioned one on the other, certain of the discs being divided into segments and marked to simulate the exact divided fractional portions of a circle, each of the last mentioned discs simulating the portions of the circle and all of said discs being apertured, the apertures being arranged in a circle conforming to the circle on the base member upon which the pins are positioned for retaining the segments in alignment on the pins, the apertures being in a correct position relative to said pins to define a complete circle of spaced apertures, said discs adapted to be removably positioned on said vertical pins.

KENNETH V. DAVIS.

REFERENCES CITED

The following references are of record in the file of this patent:

UNITED STATES PATENTS

| Number | Name | Date |
|---|---|---|
| 151,971 | Harrington | June 16, 1874 |
| 2,494,497 | Trapnell | Jan. 10, 1950 |

FOREIGN PATENTS

| Number | Country | Date |
|---|---|---|
| 25,370 | Great Britain | Nov. 20, 1902 |
| 162,372 | Great Britain | Apr. 26, 1921 |